United States Patent
Greene et al.

(10) Patent No.: US 8,037,501 B2
(45) Date of Patent: Oct. 11, 2011

(54) METHODS FOR ENTERTAINMENT-PROGRAMMING DISTRIBUTION

(75) Inventors: Bob Greene, Lone Tree, CO (US); John C. Beyler, Highlands Ranch, CO (US); Rebecca R. Lim, Englewood, CO (US); John S. Fukuda, Denver, CO (US)

(73) Assignee: Starz Entertainment, LLC, Englewood, CO (US)

( * ) Notice: Subject to any disclaimer, the term of this patent is extended or adjusted under 35 U.S.C. 154(b) by 1476 days.

(21) Appl. No.: 11/123,965

(22) Filed: May 6, 2005

(65) Prior Publication Data

US 2006/0253887 A1    Nov. 9, 2006

(51) Int. Cl.
*H04N 7/173* (2006.01)
(52) U.S. Cl. .................. 725/86; 725/87; 725/88
(58) Field of Classification Search .................. None
See application file for complete search history.

(56) References Cited

U.S. PATENT DOCUMENTS

| | | | |
|---|---|---|---|
| 5,130,792 A | 7/1992 | Tindell et al. |
| 5,191,573 A | 3/1993 | Hair |
| 5,357,276 A | 10/1994 | Banker et al. |
| 5,530,754 A | 6/1996 | Garfinkle |
| 5,534,941 A | 7/1996 | Sie et al. |
| 5,568,181 A | 10/1996 | Greenwood et al. |
| 5,583,561 A | 12/1996 | Baker et al. |
| 5,585,838 A | 12/1996 | Lawler et al. |
| 5,589,892 A | 12/1996 | Knee et al. |
| 5,604,528 A | 2/1997 | Edwards et al. |
| 5,619,247 A | 4/1997 | Russo |
| 5,619,249 A | 4/1997 | Billock et al. |
| 5,623,613 A | 4/1997 | Rowe et al. |
| 5,630,119 A | 5/1997 | Aristides et al. |
| 5,701,383 A | 12/1997 | Russo et al. |
| 5,721,815 A | 2/1998 | Ottesen et al. |
| 5,790,935 A | 8/1998 | Payton |
| 5,805,154 A | 9/1998 | Brown |
| 5,850,218 A | 12/1998 | LaJoie et al. |

(Continued)

FOREIGN PATENT DOCUMENTS

WO    WO 00/59220 A1    10/2000

OTHER PUBLICATIONS

Ciciora, Walter, et al., Modem Cable Television Technology, Video, Voice, an Data Communications, Morgan Kaufmann Publishers, Inc., 1999, Chapter 16, pp. 659-688.

(Continued)

*Primary Examiner* — William Trost, IV
*Assistant Examiner* — Oschta Montoya
(74) *Attorney, Agent, or Firm* — Kilpatrick Townsend & Stockton LLP

(57) ABSTRACT

Methods for entertainment-programming distribution are provided. A set of entertainment programs is transmitted in real time over a public network for display on user computers in communication with the public network and identified as subscribers to the set of entertainment programs. A notification signal is transmitted with at least one of the entertainment programs to identify that entertainment program as available for download. A request is received from one of the user computers over the public network to download that entertainment program. It is verified that the user computer is authorized to receive downloaded entertainment programs in accordance with a subscriber agreement. The identified entertainment program is then downloaded to the user computer.

28 Claims, 13 Drawing Sheets

U.S. PATENT DOCUMENTS

| | | | |
|---|---|---|---|
| 5,892,535 A | 4/1999 | Allen et al. | |
| 5,973,683 A | 10/1999 | Cragun et al. | |
| 5,986,650 A | 11/1999 | Ellis et al. | |
| 6,049,333 A | 4/2000 | LaJoie et al. | |
| 6,065,050 A | 5/2000 | DeMoney | |
| 6,075,575 A | 6/2000 | Schein et al. | |
| RE36,801 E | 8/2000 | Logan et al. | |
| 6,163,272 A | 12/2000 | Goode et al. | |
| 6,177,931 B1 | 1/2001 | Alexander et al. | |
| 6,209,024 B1 | 3/2001 | Armstrong et al. | |
| 6,229,895 B1 | 5/2001 | Son et al. | |
| 6,233,389 B1 | 5/2001 | Barton et al. | |
| 6,233,607 B1 | 5/2001 | Taylor et al. | |
| 6,240,553 B1 | 5/2001 | Son et al. | |
| 6,253,375 B1 | 6/2001 | Gordon et al. | |
| 6,282,207 B1 | 8/2001 | Lerman et al. | |
| 6,314,572 B1 | 11/2001 | LaRocca et al. | |
| 6,314,573 B1 | 11/2001 | Gordon et al. | |
| 6,314,575 B1 | 11/2001 | Billock et al. | |
| 6,324,338 B1 | 11/2001 | Wood et al. | |
| 6,486,892 B1 | 11/2002 | Stern | |
| 6,505,348 B1 | 1/2003 | Knowles et al. | |
| 6,522,342 B1 | 2/2003 | Gagnon et al. | |
| 6,532,589 B1 | 3/2003 | Proehl et al. | |
| 6,564,380 B1* | 5/2003 | Murphy | 725/86 |
| 6,601,237 B1 | 7/2003 | Ten Kate et al. | |
| 6,614,987 B1 | 9/2003 | Ismail et al. | |
| 6,782,550 B1 | 8/2004 | Cao | |
| 7,020,892 B2 | 3/2006 | Levesque et al. | |
| 7,024,678 B2 | 4/2006 | Gordon et al. | |
| 2002/0032905 A1 | 3/2002 | Sherr et al. | |
| 2002/0054752 A1 | 5/2002 | Wood et al. | |
| 2002/0162112 A1 | 10/2002 | Javed | |
| 2003/0005453 A1* | 1/2003 | Rodriguez et al. | 725/87 |
| 2003/0088420 A1 | 5/2003 | alSafadi et al. | |
| 2003/0121047 A1* | 6/2003 | Watson et al. | 725/93 |
| 2003/0149988 A1 | 8/2003 | Ellis et al. | |
| 2003/0154481 A1* | 8/2003 | Andersen et al. | 725/47 |
| 2003/0177498 A1* | 9/2003 | Ellis et al. | 725/60 |
| 2004/0068745 A1* | 4/2004 | Yamamoto et al. | 725/87 |
| 2005/0204389 A1 | 9/2005 | Proehl et al. | |
| 2005/0216940 A1* | 9/2005 | Black | 725/87 |
| 2006/0085821 A9* | 4/2006 | Simmons et al. | 725/61 |
| 2006/0218604 A1* | 9/2006 | Riedl et al. | 725/91 |
| 2006/0253417 A1 | 11/2006 | Brownrigg et al. | |
| 2007/0240193 A1 | 10/2007 | Sie et al. | |

OTHER PUBLICATIONS

Leibowitz, Dennis H., Interactive TV: Turning Couch Potatoes into Mouse Potatoes, Cable TV and New Media: Law & Finance, Media Law Publishing Corp., Apr. 2000, vol. XVIII, No. 1, 6 pages.

U.S. Appl. No. 09/687,149, filed Oct. 12, 2000, Office Action mailed Nov. 18, 2004, 10 pages.

U.S. Appl. No. 09/687,149, filed Oct. 12, 2000, Final Office Action mailed Aug. 12, 2005, 14 pages.

U.S. Appl. No. 09/687,149, filed Oct. 12, 2000, Office Action mailed Feb. 27, 2006, 14 pages.

U.S. Appl. No. 09/687,149, filed Oct. 12, 2000, Final Office Action mailed Jun. 30, 2006, 14 pages.

U.S. Appl. No. 09/687,149, filed Oct. 12, 2000, Office Action mailed Jan. 16, 2007, 9 pages.

U.S. Appl. No. 09/687,149, filed Oct. 12, 2000, Notice of Allowance mailed May 4, 2007, 4 pages.

U.S. Appl. No. 11/753,296, filed May 24, 2007, Office Action mailed Dec. 10, 2009, 15 pages.

U.S. Appl. No. 11/753,296, filed May 24, 2007, Final Office Action mailed Jun. 10, 2010, 15 pages.

U.S. Appl. No. 11/753,296, filed May 24, 2007, Advisory Action mailed Aug. 20, 2010, 3 pages.

U.S. Appl. No. 11/753,296, filed May 24, 2007, Notice of Allowance mailed Jan. 14, 2011, 7 pages.

U.S. Appl. No. 09/687,148, filed Oct. 12, 2000, Office Action mailed Sep. 29, 2004, 15 pages.

U.S. Appl. No. 09/687,148, filed Oct. 12, 2000, Final Office Action mailed Jun. 6, 2005, 15 pages.

U.S. Appl. No. 09/687,148, filed Oct. 12, 2000, Advisory Action mailed Aug. 31, 2005, 2 pages.

U.S. Appl. No. 09/687,148, filed Oct. 12, 2000, Office Action mailed Jan. 31, 2006, 11 pages.

U.S. Appl. No. 09/687,148, filed Oct. 12, 2000, Final Office Action mailed Jul. 11, 2006, 12 pages.

U.S. Appl. No. 09/687,148, filed Oct. 12, 2000, Notice of Allowance mailed Nov. 2, 2006, 7 pages.

U.S. Appl. No. 11/381,921, filed May 5, 2006, Office Action mailed Nov. 12, 2008, 16 pages.

U.S. Appl. No. 11/381,921, filed May 5, 2006, Final Office Action mailed May 7, 2009, 18 pages.

U.S. Appl. No. 11/381,921, filed May 5, 2006, Advisory Action mailed Aug. 10, 2009, 3 pages.

U.S. Appl. No. 11/381,921, filed May 5, 2006, Office Action mailed Nov. 10, 2009, 21 pages.

U.S. Appl. No. 11/381,921 filed May 5, 2006, Final Office Action mailed Apr. 26, 2010, 15 pages.

U.S. Appl. No. 11/381,921, filed May 5, 2006, Office Action mailed Dec. 6, 2010, 17 pages.

* cited by examiner

“METHODS FOR
ENTERTAINMENT-PROGRAMMING
DISTRIBUTION”

CROSS-REFERENCES TO RELATED APPLICATIONS

This application is related to each of the following applications, the entire disclosure of each of which is incorporated herein by reference for all purposes: U.S. Prov. Pat. Appl. No. 60/159,202, entitled "SUBSCRIPTION VIDEO ON DEMAND," filed Oct. 13, 1999 by John J. Sie et al.; U.S. Prov. Pat. Appl. No. 60/159,469, entitled "VIDEO ON DEMAND SWITCHING SYSTEM," filed Oct. 13, 1999 by John J. Sie et al.; U.S. Prov. Pat. Appl. No. 60/163,324, entitled "MULTIPLE VIDEO STORAGE SYSTEM," filed Nov. 3, 1999 by John J. Sie et al.; U.S. patent application Ser. No. 09/687,142, entitled "VIDEO ON DEMAND SWITCHING SYSTEM," filed Oct. 12, 2000 by John J. Sie et al.; U.S. patent application Ser. No. 09/687,141, entitled "PRE-STORING A PORTION OF A PROGRAM TO ALLOW USER CONTROL OF PLAYBACK," filed Oct. 12, 2000 by John J. Sie et al.; U.S. patent application Ser. No. 09/687,138, entitled "LOCAL NEAR VIDEO ON DEMAND STORAGE," filed Oct. 12, 2000 by John J. Sie et al.; U.S. patent application Ser. No. 09/687,157, entitled "LOCAL STORAGE OF LINEARLY SCHEDULED PROGRAMS," filed Oct. 12, 2000 by John J. Sie et al.; U.S. patent application Ser. No. 09/687,149, entitled "PROGRAMMING DISTRIBUTION SYSTEM," filed Oct. 12, 2000 by John J. Sie et al.; U.S. patent application Ser. No. 09/687,148, entitled "PROGRAMMING DISTRIBUTION AND NOTIFICATION SYSTEM," filed Oct. 12, 2000 by John J. Sie et al.; U.S. patent application Ser. No. 09/687,139, entitled "METHOD FOR PROVIDING PROGRAMMING DISTRIBUTION," filed Oct. 12, 2000 by John J. Sie et al.; U.S. patent application Ser. No. 09/687,140, entitled "METHOD FOR AUTHORIZING LIMITED PROGRAMMING DISTRIBUTION," filed Oct. 12, 2000 by John J. Sie et al.; and U.S. patent Ser. No. 09/687,877, entitled "MULTIPLEXED DIGITAL CHANNEL STORAGE," filed Oct. 12, 2000 by John J. Sie et al. (sometimes referred to collectively herein as "the SVOD applications").

This application is also related to each of the following concurrently filed applications, the entire disclosure of each of which is also incorporated herein by reference for all purposes: U.S. Prov. Pat. Appl. No. 60/678,313, entitled "LOCAL CONTEXT NAVIGATION SYSTEM," by Bob Greene et al.; U.S. Prov. Pat. Appl. No. 60/678,255, entitled "MULTILEVEL BANDWIDTH CHECK," by Bob Greene et al.; and U.S. Prov. Pat. Appl. 60/678,256, entitled "PERSONAL VIDEO ON DEMAND," by Stephen J. Montgomery.

BACKGROUND OF THE INVENTION

This application relates generally to content delivery. More specifically, this application relates to systems and methods for distributing entertainment programming to customers.

There are a number of methods of delivering content to customers. Some such methods deliver the programming directly to a individual business or residence by using satellite, microwave, UHF, VHF, or cable to a set-top box of a user. Most content is available according to a linear schedule published in programming guides. Certain additional services are available with some of these delivery systems, such as pay-per-view ("PPV"), video-on-demand ("VOD"), and near-video-on-demand ("NVOD"). A PPV service allows a user to purchase the right to play an entertainment program according to a linear schedule. A VOD service provides a user with the ability to access an entertainment-program stream at any desired time. A NVOD service is a hybrid service where an entertainment program is available on a number of different channels in a linear program with staggered start times.

Each of the PPV, VOD, and NVOD services store the program content remote from the user for delivery on a dedicated or shared channel. Both PPV and NVOD services provide programming broadcast according to a linear schedule, with multiple users sharing that single channel. In contrast, the VOD service singlecasts the program content on a dedicated channel available to a single user.

Other mechanisms for delivering content to users use physical distribution mechanisms such as digital versatile disks ("DVDs"). Typically such distribution mechanisms are provided for rent in a shop that is physically visited by a customer, who either pays for a one-time rental fee or who has a subscription package entitling the customer to borrow a certain number of the physical distribution mechanisms in a specified time period. More recently, such a rental model has been expanded to use conventional postal services for distribution. That is, a customer may provide a list of desired programming to a company, which mails a DVD to a customer, who watches the programming and returns the DVD by mail when complete; upon receipt of a returned DVD, the company mails the DVD having the programming identified next on the customer's list.

BRIEF SUMMARY OF THE INVENTION

Embodiments of the invention thus provide methods for entertainment-programming distribution. A set of entertainment programs is transmitted in real time over a public network for display on user computers in communication with the public network and identified as subscribers to the set of entertainment programs. A notification signal is transmitted with at least one of the entertainment programs to identify that entertainment program as available for download. A request is received from one of the user computers over the public network to download that entertainment program. It is verified that the user computer is authorized to receive downloaded entertainment programs in accordance with a subscriber agreement. The identified entertainment program is then downloaded to the user computer.

Embodiments of the invention may provide for purchase of identified programs, by downloading the program without restriction, downloading the program onto a portable storage medium at the user computer, downloading the program into a portable media player, downloading the program onto a storage medium at a television by transmitting the program through television-programming distribution system, or by arranging for shipment of a portable storage medium containing the program. Embodiments of the invention may also provide for downloads to be performed substantially immediately, or to be performed at a later time specified by the user. Furthermore, in some embodiments, the notification signal may be provided in a menu of entertainment programs rather that with real-time transmission of the program.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF SPECIFIC EMBODIMENTS

This application describes methods and systems for distributing entertainment programming. As used herein, "entertainment programming" is intended to refer to a plurality of "entertainment programs," each of which is a sequence of visual images and synchronized audio produced for distribution as entertainment. Examples of entertainment programs thus include movies, television programs, and the like. For convenience, "entertainment programs" are sometimes referred to herein as "programs," the terms intended to be synonymous. Embodiments permit customers of a content subscription service to download entertainment programs from a content provider. Each entertainment program is downloaded with a time restriction that permits the program to played by the user within a specified time period. After the time period has expired, limitations included with the downloaded copy prevent the program from being played. The time period may be a relative time period measured from the time of the download or may be an absolute time period that specifies specific dates when certain entertainment programming for all customers of the content subscription service lose access to the programming. Because the customer has a downloaded copy of the program, it may be played at any time and with program control that permits the customer to manipulate progression of the program with such commands as "rewind," "fast-forward," "pause," and the like.

In some embodiments, the content subscription service may be integrated with a subscription video-on-demand ("SVOD") service that permits customers to view certain programming with playback control on their televisions, without directly providing a downloaded copy of the program. The SVOD service provides a linear schedule of programming that customers may watch in real time as the program is broadcast, with a subset of the customers who are members of the "club" that may access some of the linearly scheduled content with program control. A full discussion of the SVOD service and its implementation in several embodiments is provided in the SVOD applications, which have been incorporated herein by reference.

In still other embodiments, the content subscription service may be integrated with a service for purchasing the content. In such embodiments, a customer may be given permanent access to a downloaded program so that the customer may view the program at any time indefinitely.

Figure 1:
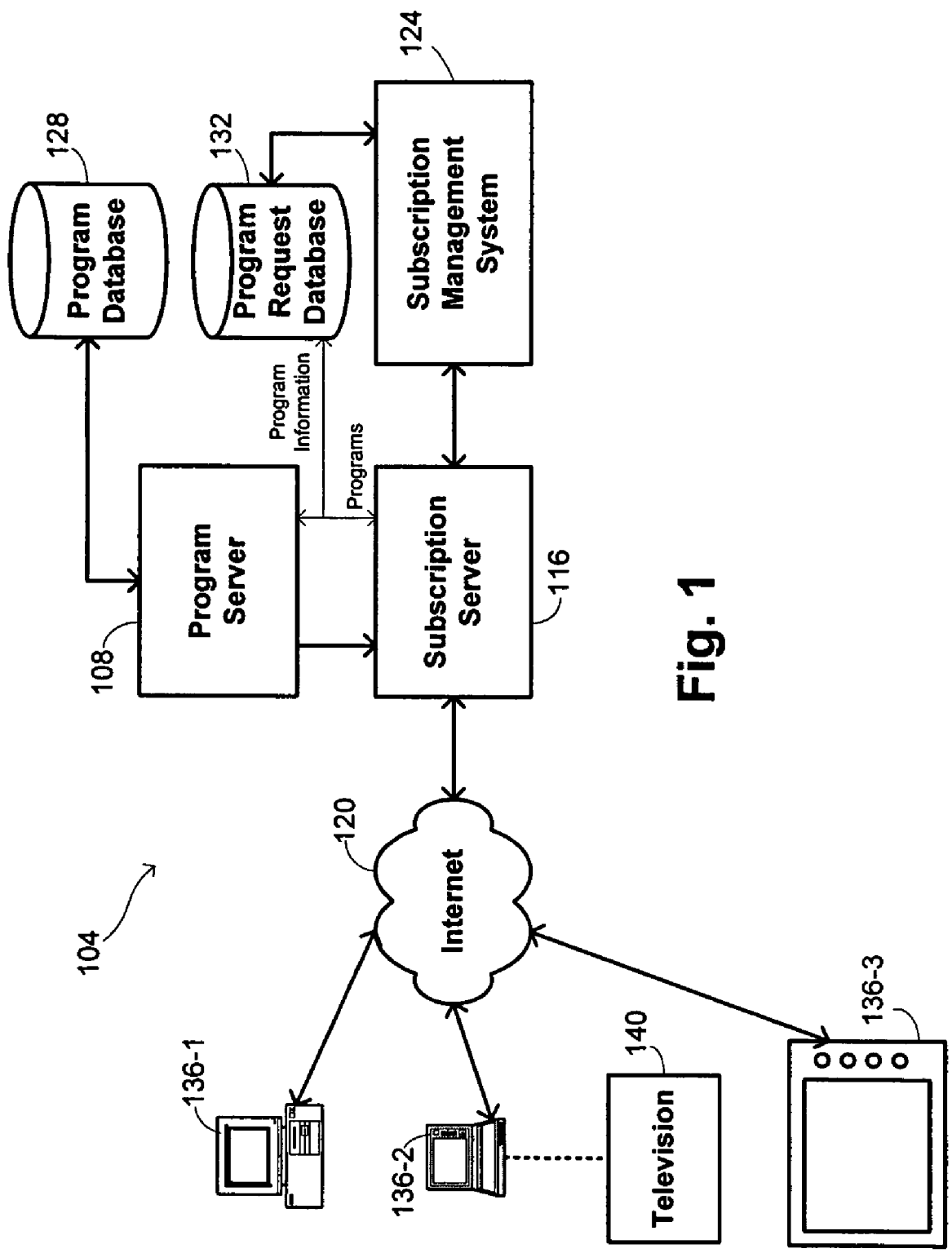
FIG. 1 is a block diagram that provides a schematic illustration of an embodiment of an entertainment-programming-distribution system.

An overview of the program-distribution systems of the present invention may be understood with reference to FIG. 1, which is a block diagram that provides a schematic overview of the system. The structure shown in FIG. 1 is intended to illustrate the basic structure of the downloading system and therefore does not include components that permit it to be integrated with SVOD services or purchasing services. Such integration is discussed in greater detail in connection with other drawings below.

The programming distribution system 104 includes a subscription server 116 interfaced with a public network such as the Internet 120, a program server 108, and a subscription management system 124. Program information is stored in a program database 128 and program-request information is stored in a program-request database 132. Customers interface with the system using computers 136 interfaced with the public network 120. The customer computers 136 may comprise a desktop computer 136-1 or a portable computer 136-2 such as a laptop, with the portability provided by the portable computer 136-2 conveniently permitting downloaded content to be moved to different locations, or may comprise a portable media player 136-3.

The subscription management system 124 coordinates overall management of customer subscriptions to the downloading service. In addition, interactive screens for selecting services are formulated by the subscription management system 124. The screens allow the customer to select additional products or services. The subscription server 116 stores content that is provided for distribution over the public network 120. Programs are stored in compressed digital form. Preferably, MPEG-4 compression is used, although this is not a requirement of the invention and other algorithms such as MPEG-2, VC-1, WindowsMedia, RealVideo, or QuickTime may be used for compressing the program content. The programs may be downloaded from a program database 128 by a program server 108 or may be provided on removable storage media such as tapes or disks. Additionally, real-time content may be provided over the public network 120 as part of a simulcast service.

The program-request database 132 may store customer-specific information and programming information. The customer-specific information includes such information as name, address, IP address, membership history, available credit, and the like, as well as a history of programs that have been downloaded by each customer, specifying each program, when it was downloaded, etc. Programming information includes such information as schedules for simulcast programming distribution, program descriptions, upcoming specials, and the like. In addition, the program-request database 132 may store parental control information that restricts the type of programs that may be downloaded according to content classifications and customer specifications. Both the program server 108 and the subscription management system 124 may interact with the program-request database 132. For example, the program server 108 may provide information to the program-request database 132 when programming is downloaded to manage compliance with subscription requirements and to provide information that may be used for customer billing and the like. The subscription management system 124 may use information stored on the program-request database 132 for accounting purposes and for formulating menu screens presented to the user. For example, a customer might wish to know his account balance or to review a history of programs that have previously been downloaded. This usage information is stored in the program-request database 132 and used by the subscription management system 124 in administering the system.

Once a program has been downloaded to a customer computer 136, the customer may generally play the program using software loaded onto the computer 136 without maintaining an active connection with the public network 120. One example of commercially available software that may be used for program playback is RealPlayer®, although any suitable commercial or proprietary software may be used. In the basic arrangement shown in FIG. 1, no mechanism is provided for direct transmission by the system to a customer television 140. A customer may, however, provide a connection between the computer 136 on which the program has been downloaded and the television on which he wishes to view it. Suitable connections include Standard (Composite) Video Output and Audio Output, S-Video Output, and Digital Visual Interface ("DVI") Output.

Figure 2:
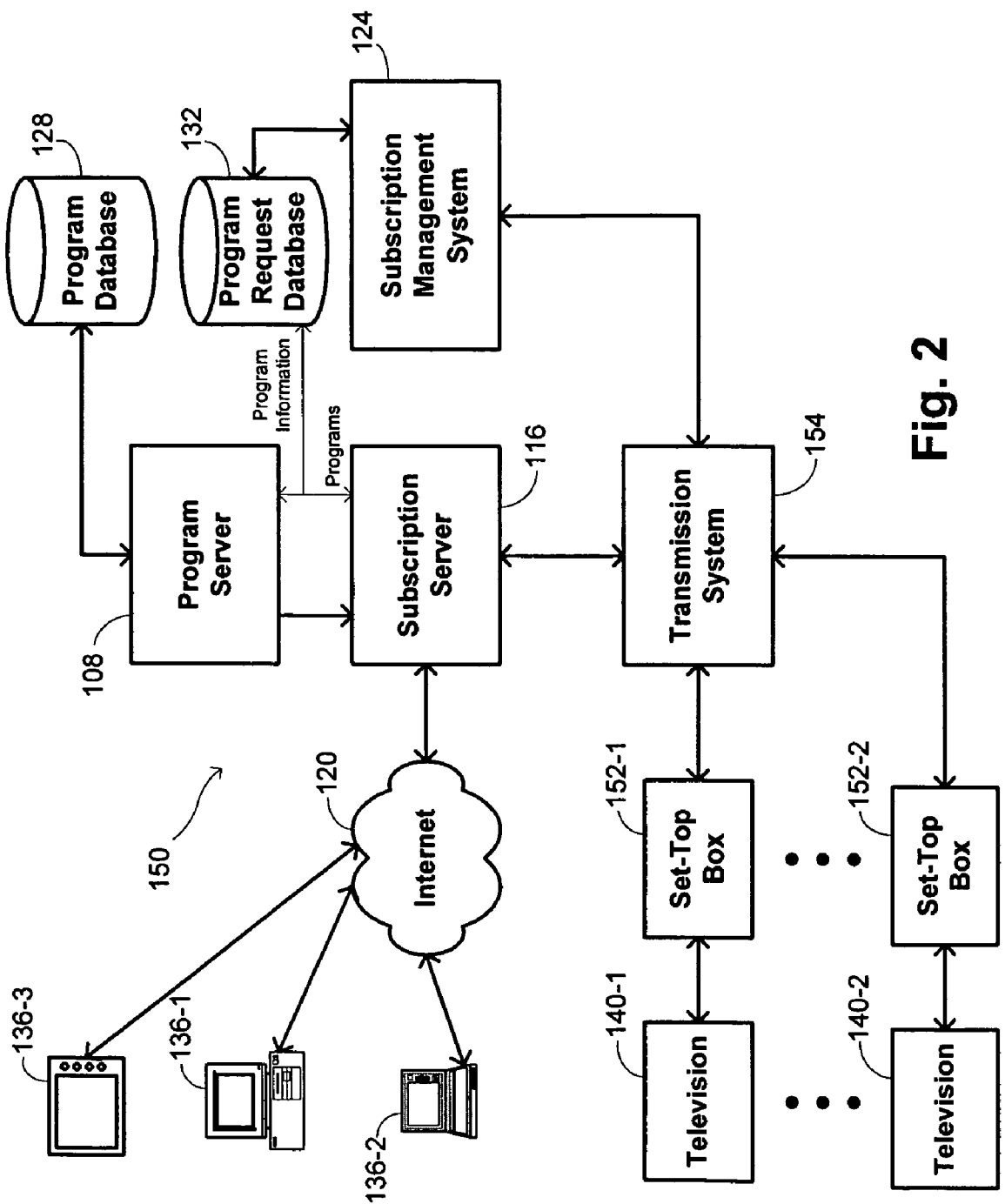
FIG. 2 is a block diagram that provides a schematic illustration of an embodiment that integrates the entertainment-programming-distribution system of FIG. 1 with a subscription video-on-demand system.

In other instances, access to the program over a television connected a cable system may be provided by integrating the system with an SVOD system, as illustrated with the block diagram of FIG. 2. The SVOD system provides a mechanism by which a user may be provided with program control over a certain class of programs. By adding the customer's desired program to this class, the customer is provided with an experience over his television that is similar to the experience available over his computer when the program is downloaded. Specifically, the customer is provided with access to the program so that it may be played at any desired time within a subscription window, and with program control that permits the customer to manipulate progression of the program as desired. The SVOD system is integrated with the system of FIG. 1 by providing a transmission system 154 that multiplexes various programs onto a conduit coupled to set-top boxes 152 at various customer locations. The set-top boxes 152 interface with respective televisions 140 at customer locations to provide the programming. In some embodiments, the same programming is simulcast through the transmission system 154 to subscriber televisions and over the public network 120 so that subscribers may conveniently access content through their televisions and/or computers depending on their circumstances and locations at any particular time.

Typically, frequency-division multiplexing techniques are used to transmit the various program streams onto a single coaxial cable, an optical fiber, or a combination thereof. The transmission system 154 may include analog-to-digital converters, digital compression hardware, multiplexers, and other components to make best use of available bandwidth. The subscription management system 124 controls the transmission system 154 to route the appropriate program streams to the desired set-top box 152 of the customer. Although not shown in FIG. 2, one or more nodes may be interposed between the transmission system 154 and each set-top box 152, as is well known in the art.

Although the program-request database 132 is separate from the subscription management system 124 in the embodiments described in connection with FIGS. 1 and 2, the functionality of those components may be combined in other alternative embodiments. In particular, both customer-specific and programming information could be provided to the subscriber management system 124 for administration from there with appropriate hardware and software.

Figure 3:
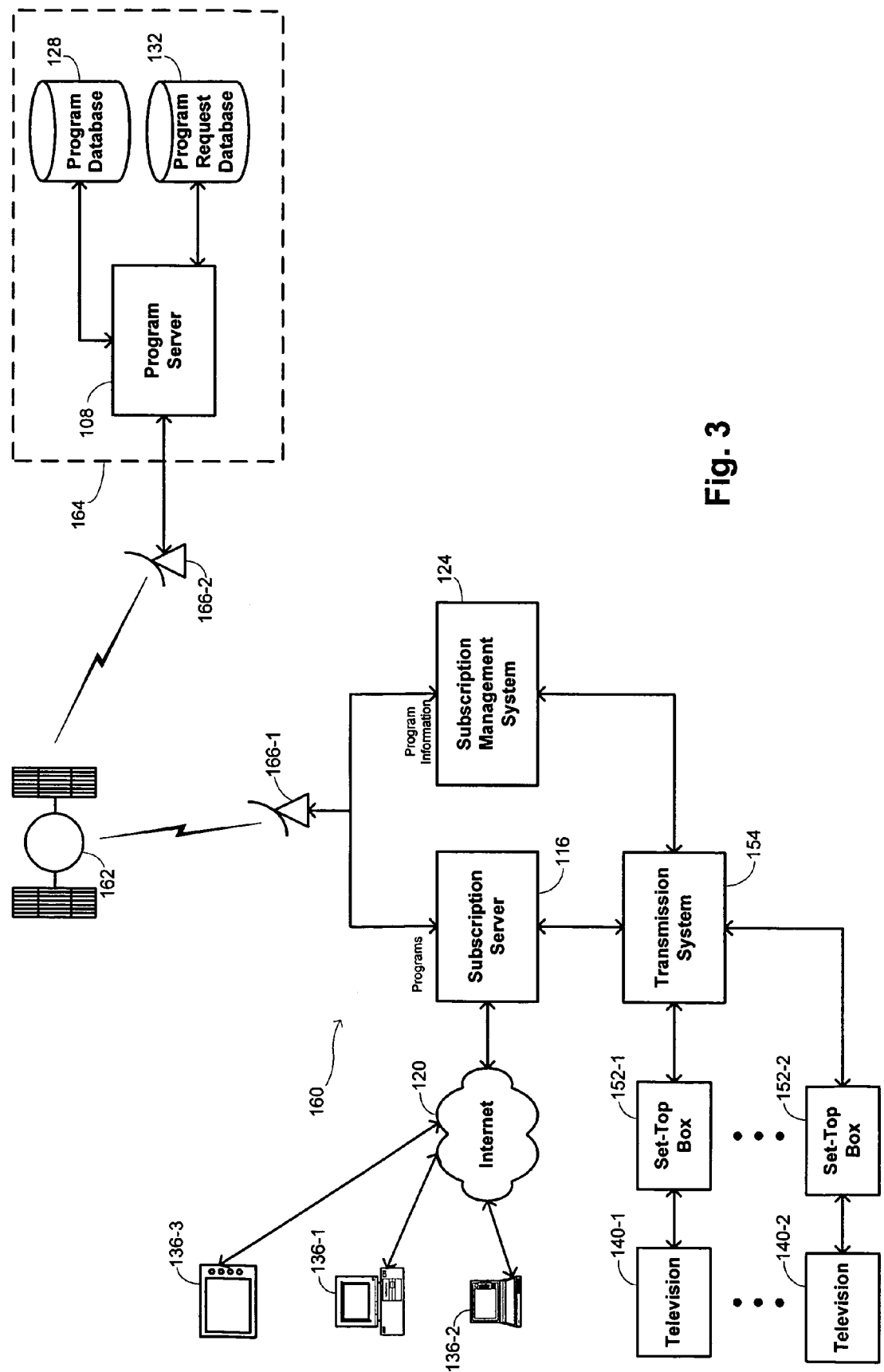
FIG. 3 is a block diagram that provides a schematic illustration of an embodiment for an entertainment-programming-distribution system that uses a satellite-based transmission system.

In other instances, the program server 132 may be part of a system of an additional content provider. In some such cases, the additional content provider system may be separated from the downloading (and perhaps also SVOD) system. Such an embodiment is illustrated in FIG. 3, with the additional content provider system denoted by reference number 164. Such an arrangement permits the additional content provider to have a central location that could communicate with a number of downloading system providers located in remote geographical locations. First and second satellite dishes 166-1 and 166-2 communicate through a satellite 162, which provides bidirectional communication that permits the subscriber management system 124 to interact with the program server 108 and program-request database 132. The satellite communications permit the program server 108 to deliver programming to the subscription server 116 so that the programming may be downloaded over the public network 120 as described above or delivered to a transmission system 154 for display over a television 140 through a set-top box 152.

In many embodiments, the downloading of programming to a customer computer 136 is performed as part of a subscription arrangement in which the customer is only permitted to access the program for a specified period of time. The downloaded program accordingly includes controls that prohibit its play after the specified period of time has expired. Thus, while the customer is able to view the program as frequently as desired within the subscription time period, he is unable to view the program outside of that time period.

Figure 4:
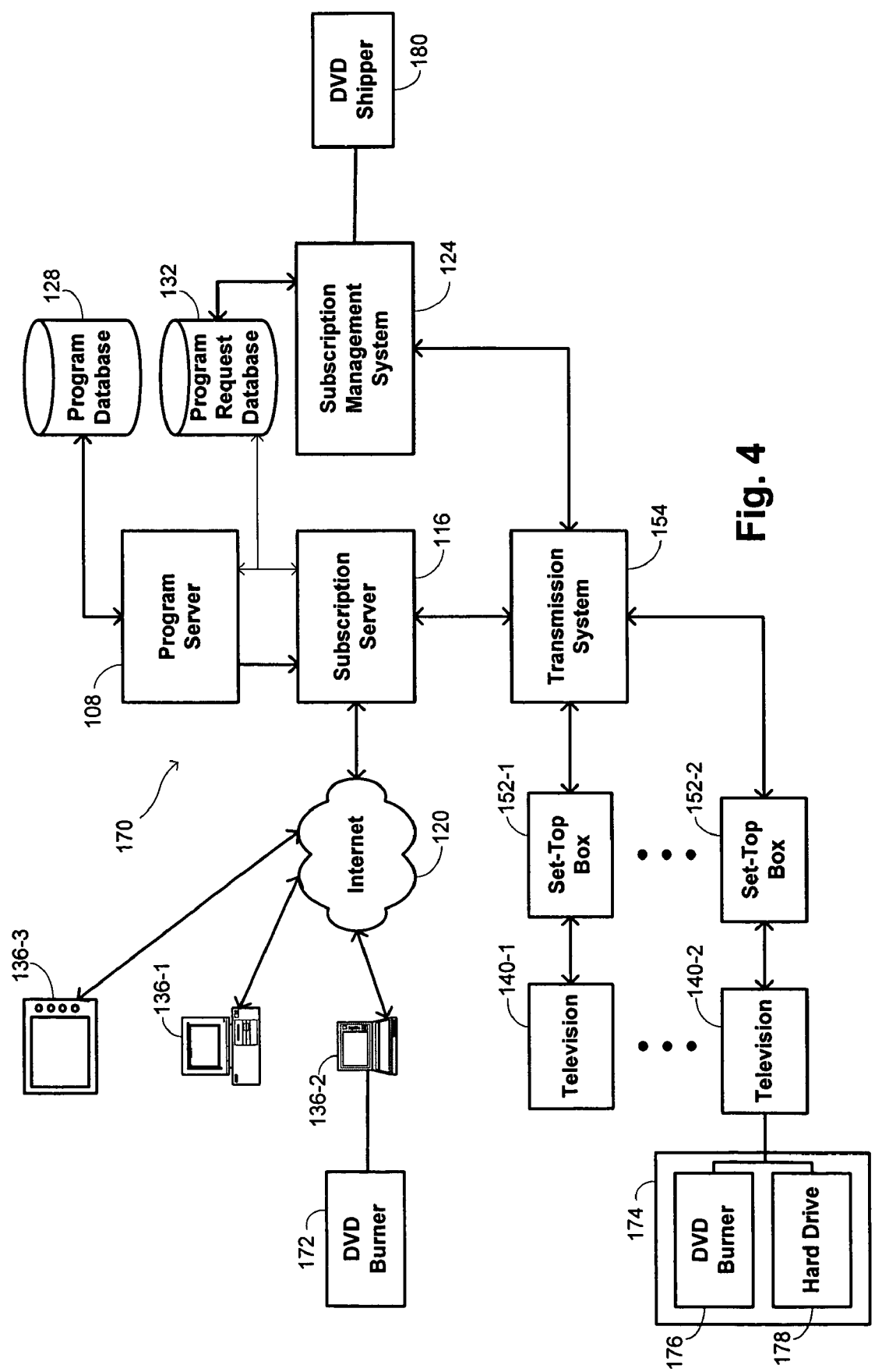
FIG. 4 is a block diagram that provides a schematic illustration of an embodiment for an entertainment-programming-distribution system that permits the sale of a permanent copy of entertainment programming to customers.

There may be cases where a customer wishes to purchase the program so that she will have access to it indefinitely. Such purchasing arrangements may be accommodated in a number of different ways using the structure of the system. FIG. 4 illustrates some additional structure that may be used to provide such functionality. In most instances, the systems as described in connection with FIGS. 1-3 are already capable of such functionality, requiring only that the customer have the hardware for creating a permanently accessible copy of the program. One way in which the sale of the program may be made is by removing the subscription restrictions on a program that is downloaded to a customer computer 136 so that the program may be viewed at any time, irrespective of the limitations normally imposed with the subscription model. In other instances, a device may be used may create a separate copy of the program on a portable storage medium such as a DVD. For example, if a customer has a DVD burner 172 coupled to or integrated within her computer 136-2, the program may be written to a DVD and then transported by the customer for viewing on other computers or on televisions that are coupled with DVD players.

A similar process may be used when the system includes a mechanism for transmitting programming directly to a customer television 140 through a transmission system 154, such as may be used in implementing an SVOD service as described above. The customer television 140-2 may be coupled with a consumer product 174 that permits content to be burned to a DVD with a DVD burner 176 and/or for content to be written to a hard drive 178 integrated within the consumer product 174. Accordingly, in such instances, the program is directed to the set-top box 152-2 without restrictions that prevent it from being copied onto such media. Writing to a DVD with such an arrangement provides the same convenience of portability for the program as writing to a DVD with the computer DVD burner 172.

In still other instances, a portable medium may be shipped to the customer through a conventional postal service. In such arrangements, the subscription management system 124 includes an interface with a commercial shipper 180 of such products. The interface may be over a public network like the Internet 120 or may be provided through other mechanisms known in the art. To effect shipment, the subscription management system 124 provides shipping information to the commercial shipper 180 extracted from the program-request database 132 and arranges for payment to the shipper 180.

The various structures described in connection with FIGS. 1-4 may be used in a number of different ways to distribute programming to subscribers. Several of these methods are described for specific embodiments in connection with FIGS. 5A-8B. The methods are described with flow diagrams, sometimes in combination with exemplary customer displays, with each flow diagram indicating a number of different possible ways in which the programming may reach the customer. Different mechanisms might be possible using only some of the structures described in connection with FIGS. 1-4 so the foregoing description attempts to identify which such structures may be suitable for implementing different aspects of the embodiments. In addition to the content-delivery arrangements described in connection with FIGS. 5A-8B, some embodiments may provide a personal video-on-demand service as described in U.S. Prov. Pat. Appl. No. 60/678,256, entitled "PERSONAL VIDEO ON DEMAND," by Stephen J. Montgomery, the entire disclosure of which has been incorporated herein by reference.

Figure 5A:
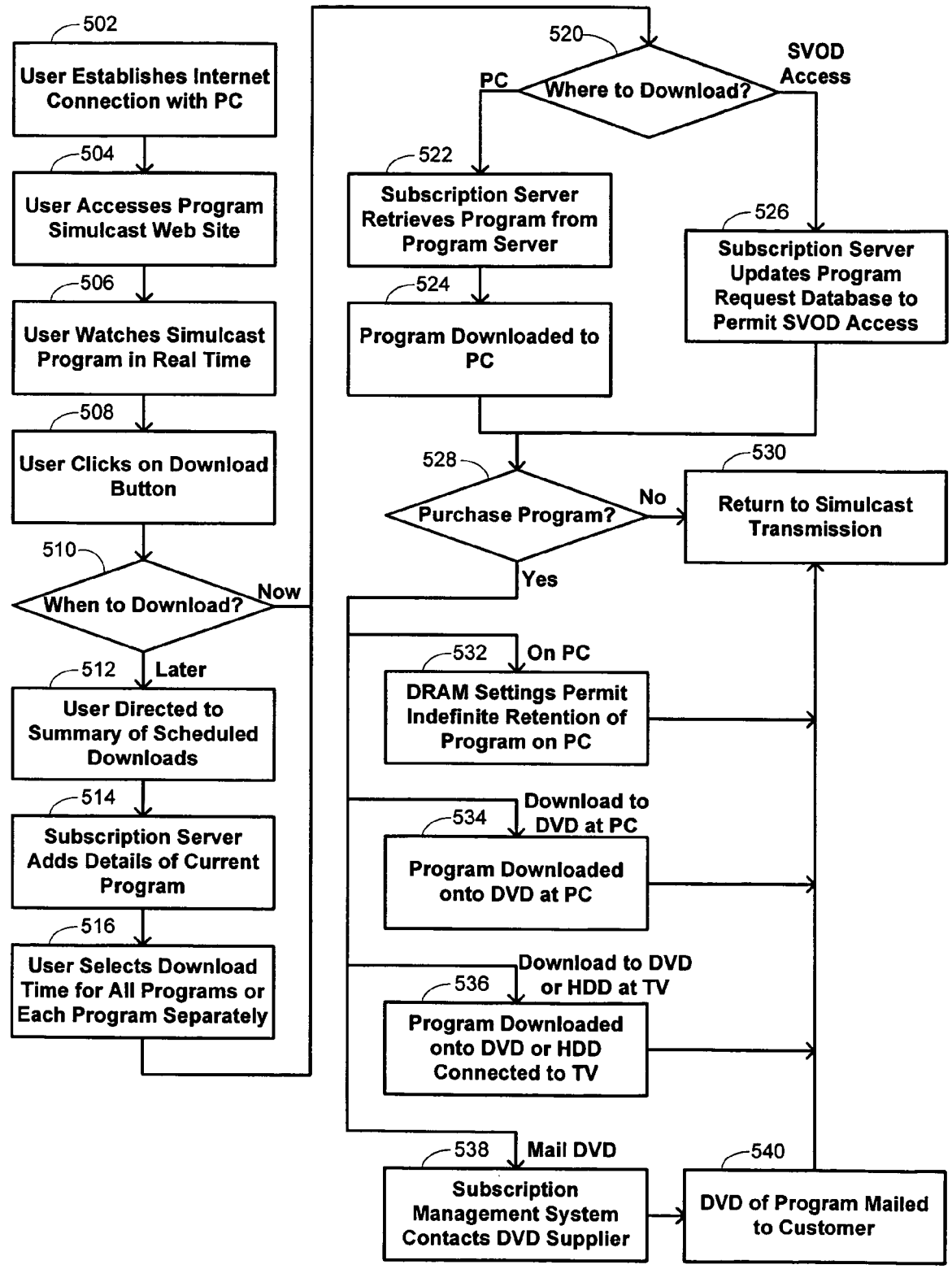
FIG. 5A is a flow diagram of a method for distributing entertainment programming according to one embodiment of the invention.

FIG. 5A provides a flow diagram that illustrates a method for distributing programming that is initiated by a user customer on his computer 136. The description of the method makes simultaneous reference to this flow diagram and to several screen displays provided to the user, examples of which are provided in FIGS. 5B-5F. The user begins the process by establishing a connection with the public network 120 with her computer 136 at block 502. This is typically accomplished using browser software provided on the computer 136. At block 504, the user accesses a site on the public network 120 that provides a program stream, such as in the form of a simulcast program stream that may also be provided to conventional content subscribers. In some instances, the subscription server 116 may ensure that the connection speed meets certain requirements as described in U.S. Prov. Pat. Appl. No. 60/678,255, entitled "MULTILEVEL BANDWIDTH CHECK," by Bob Greene et al., the entire disclosure of which has been incorporated herein by reference, perhaps in part to ensure that the download will meet any geolocation restrictions that may exist.

Figure 5B:
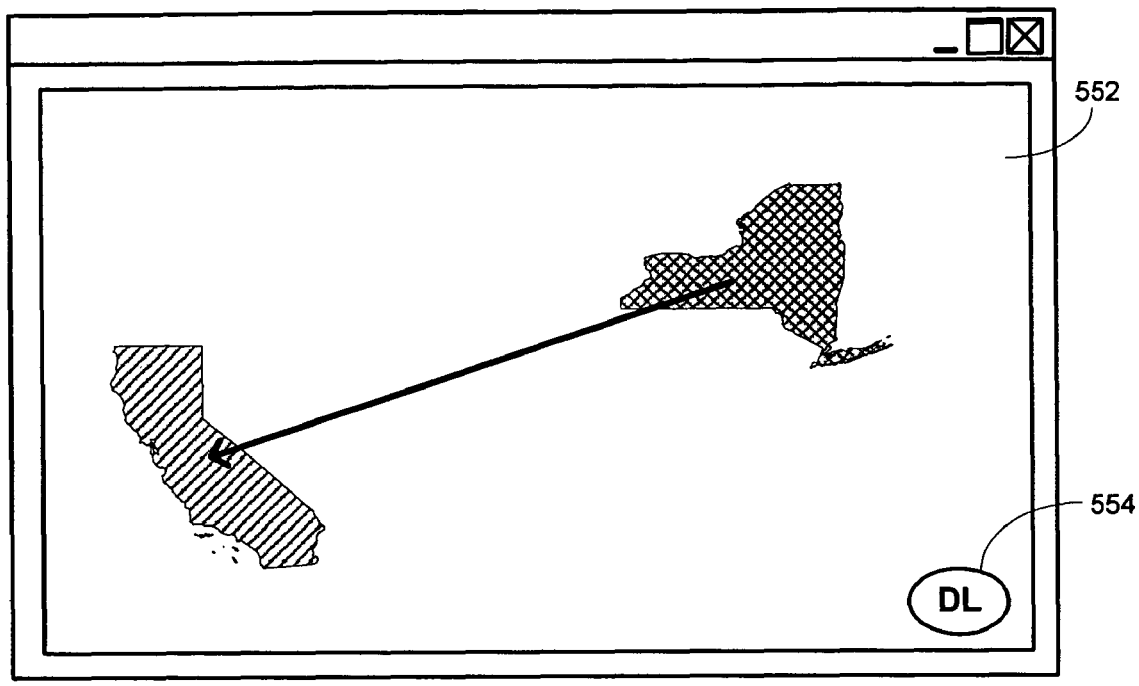
FIGS. 5B-5F are examples of screen displays that may be provided on a computer to a customer in implementing the method of FIG. 5A.
Figure 5C:
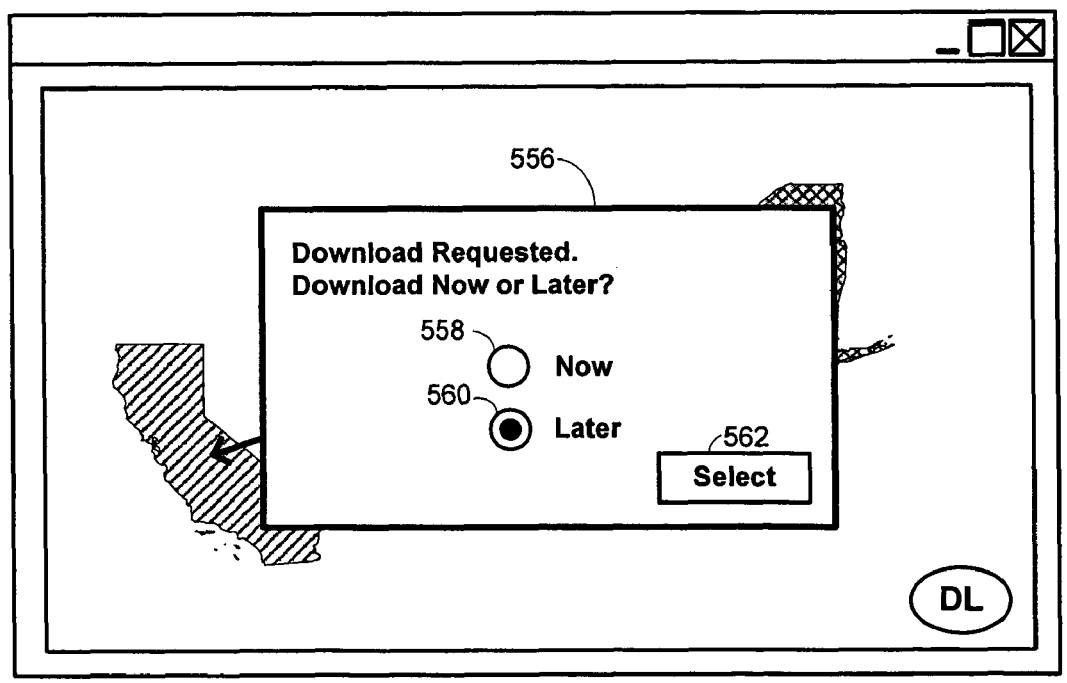

The user may watch the program in real time at block 506. An example of the view seen by the user during such real-time program transmission is shown in FIG. 5B. The program 552 is visible on the computer screen and includes a download button 554 that indicates the availability of the program being viewed for download, and which may be activated to initiate the download. When the user clicks on the download button 554 at block 508 using a mouse or other pointer device, the system may provide an option at block 510 to start the download immediately or at a later time. FIG. 5C illustrates that such an option may be indicated to the user with a pop-up window 556 that includes radio-button options 558 and 560 to begin the download immediately or to permit the download to begin at a later time. The user makes her selection by choosing one of the radio buttons and clicking a selection button 562.

The option to begin downloading at a later time allows the user to avoid the inconvenience of an immediate download when a network connection may be needed for other tasks, particularly since the size of the programs may use a significant block of time. The downloading consumes bandwidth allocated to the user, who may be using the system at a time of day when many other users are consuming network resources. If the download were performed immediately, the throughput of a shared network connection may be reduced, causing slower download times. In addition, the download uses processor and disk-access resources of the user's computer that may interfere with other applications being used by the user and render the response unacceptable. In some instances, however, the user may know that an immediate download will not interfere with processor or network performance and/or may wish to have the downloaded program more immediately. In those cases, the user may prefer to elect at block 510 for the download to begin immediately.

Figure 5D:
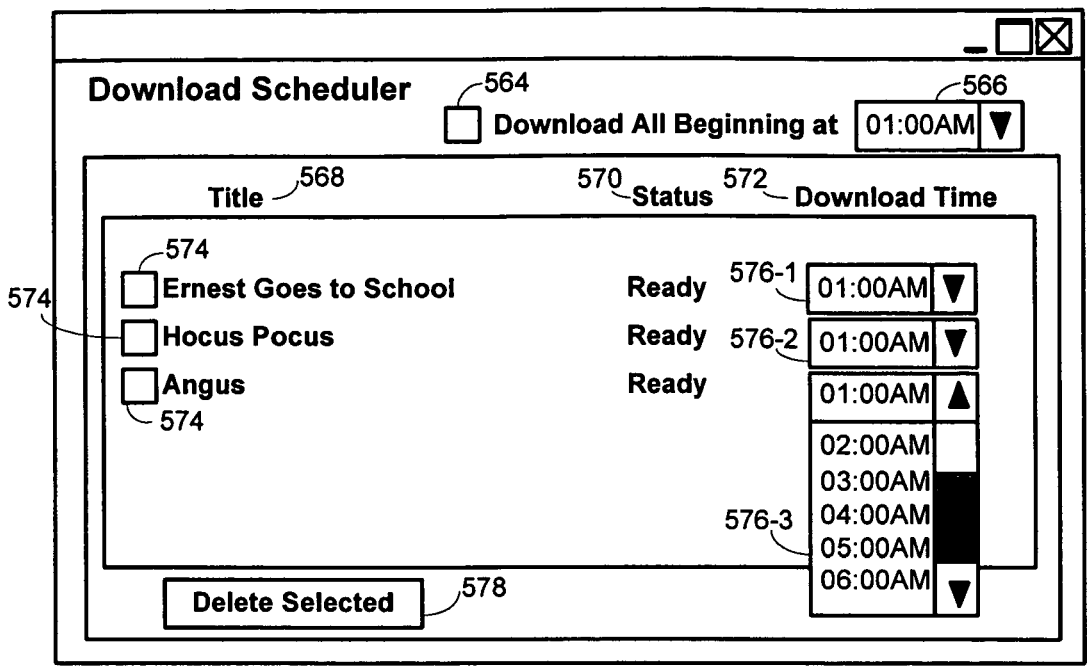
Figure 5E:
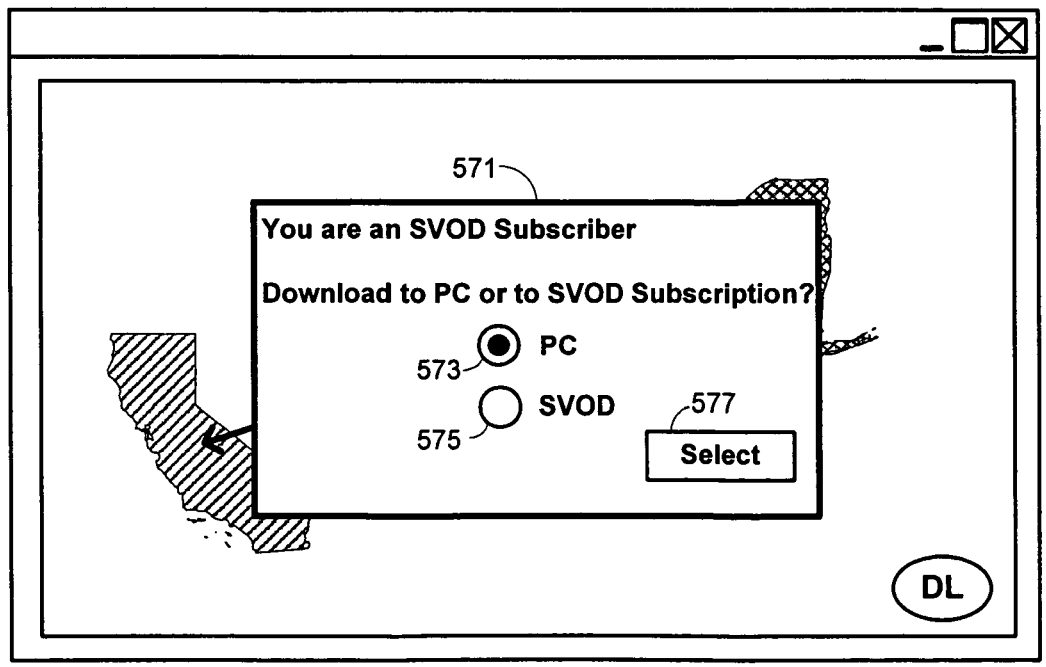

If the user elects to have the download occur at a later time, the user is directed at block 512 to a page summarizing scheduled downloads, an example of which is provided in FIG. 5D. The summary page includes a listing of all programs that are scheduled to be downloaded, with the current program being added to the page by the system at block 514. This page permits the user to manage the program downloads, including having the capability of removing programs from the scheduled download, and changing download times, either on an individual or global basis. The central part of the page includes a listing of each of the programs scheduled for download, including a title 568, status 570, and perhaps also scheduled download time 572. In the illustrated embodiment, an option is provided to specify the download time of each of the programs with a drop-down menu 576, or to specify a time globally for downloading all the programs by checking box 564 and selecting the download start time with drop-down menu 566. Programs may be deleted from the download schedule by checking boxes 574 corresponding to the listed programs and clicking a deletion button 578. This process of managing the download of the programs is indicated at block 516 in FIG. 5A.

In embodiments where the system is integrated with a television-delivery system such as to provide as SVOD service as illustrated in FIGS. 2-4, the user may be given the option at block 520 to specify where to download the program. Such an option may be provided with a pop-up window 571 like the one shown in FIG. 5E where radio buttons 573 and a selection button are used to prompt the user to make the selection.

If the user elects to download the program to her computer, the subscription server 116 retrieves the program from the program server 108 at block 522 and downloads the program over the public network to the user's computer 136 at block 524. If the user instead elects to have access to the program provided through his television set-top box 152, the subscription server may update the program-request database 132 at block 526 to note that that set-top box 152 is to have access to that program. This feature is not a true "download" of the program since the system structure that enables subscribers to have SVOD access to programs is used to provide access; this is in contrast to the downloading indicated at block 524 when a copy of the program is actually written to the user's computer. Controlling access according to subscription terms is performed in the case of providing access through a set-top box 152 simply by implementing the subscription protocols in place for the SVOD service. In cases where an actual copy of the program is downloaded, enforcement of the subscription terms is accomplished by including restrictions on when the program may be played using techniques known in the art.

Figure 5F:
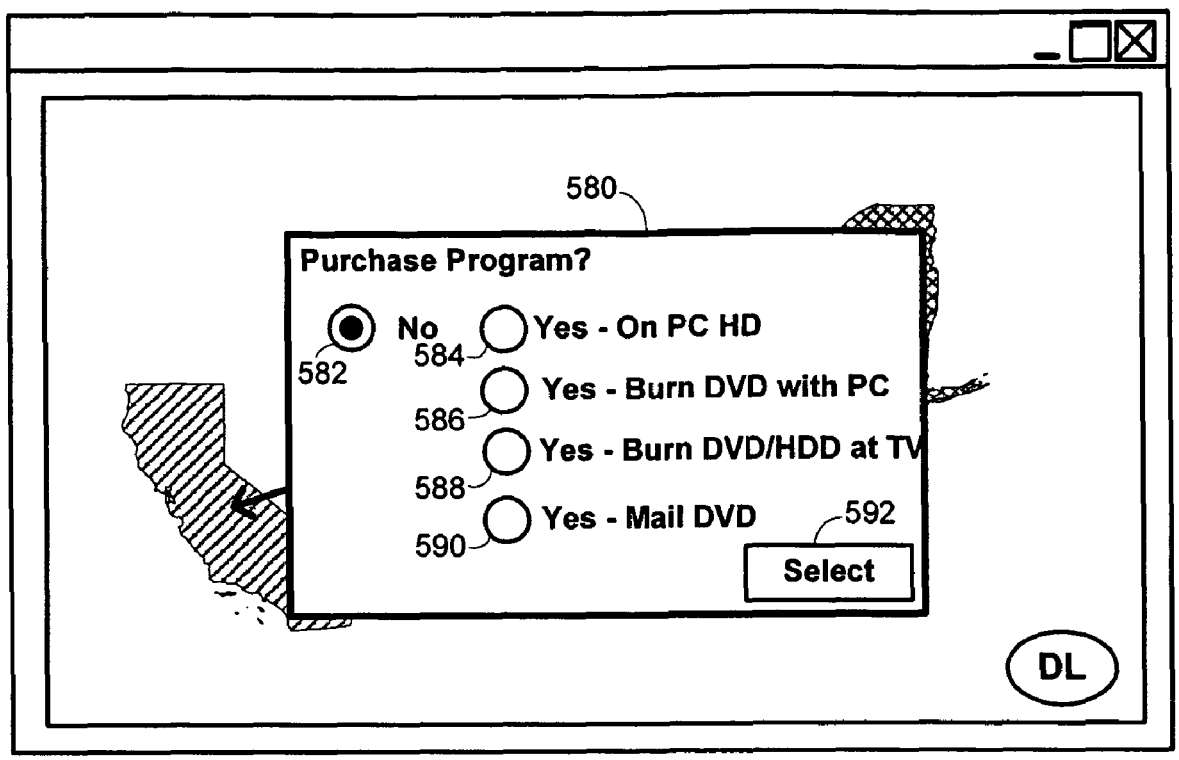

The user may also be given an option to purchase the program at block 528, such as by presenting a pop-up window 580 like the one shown in FIG. 5F. A set of radio buttons 582, 584, 586, 588, and 590 and a selection button permits the user to elect not to purchase the program or to purchase the program using one of several mechanisms that might be available. These mechanisms were described above in connection with FIG. 4 and, while all of them are displayed in the illustrative embodiment shown in FIG. 5F, there are embodiments in which only some of the options may be available. Which options are available may depend not only on what devices the user has coupled with her computer or television, but also on whether the system has access to the user's set-top box. For instance, the options to mail a DVD, to establish appropriate DRAM settings, or to burn a DVD at the user's PC may be provided with all arrangements, while the ability to download the program onto a DVD or HDD coupled with the user's television may only be available with arrangements that include transmission systems coupled with user set-top boxes.

If the user elects not to purchase the program by selecting radio button 582, the user is returned to the program transmission at block 530 of FIG. 5A. If the user elects to have permanent access to the program on her computer by selecting radio button 584, DRAM settings may be set at block 532 to permit indefinite retention of the program without playback restrictions. If the user elects to burn a DVD with her computer by selecting radio button 586, the program is downloaded at block 534 onto a DVD at the user's computer 136. If the user elects to burn a DVD and to store the program on a hard drive at her television with a consumer product 174 like the one described above, the program copy is routed through the transmission system 154 and set-top box 152 to download the program at block 536. Finally, if the user elects to have a DVD mailed by selecting radio button 590, the subscription management system 124 contacts a DVD supplier at block 538 so that a DVD of the program may be shipped to the user using a postal service at block 540.

Figure 6A:
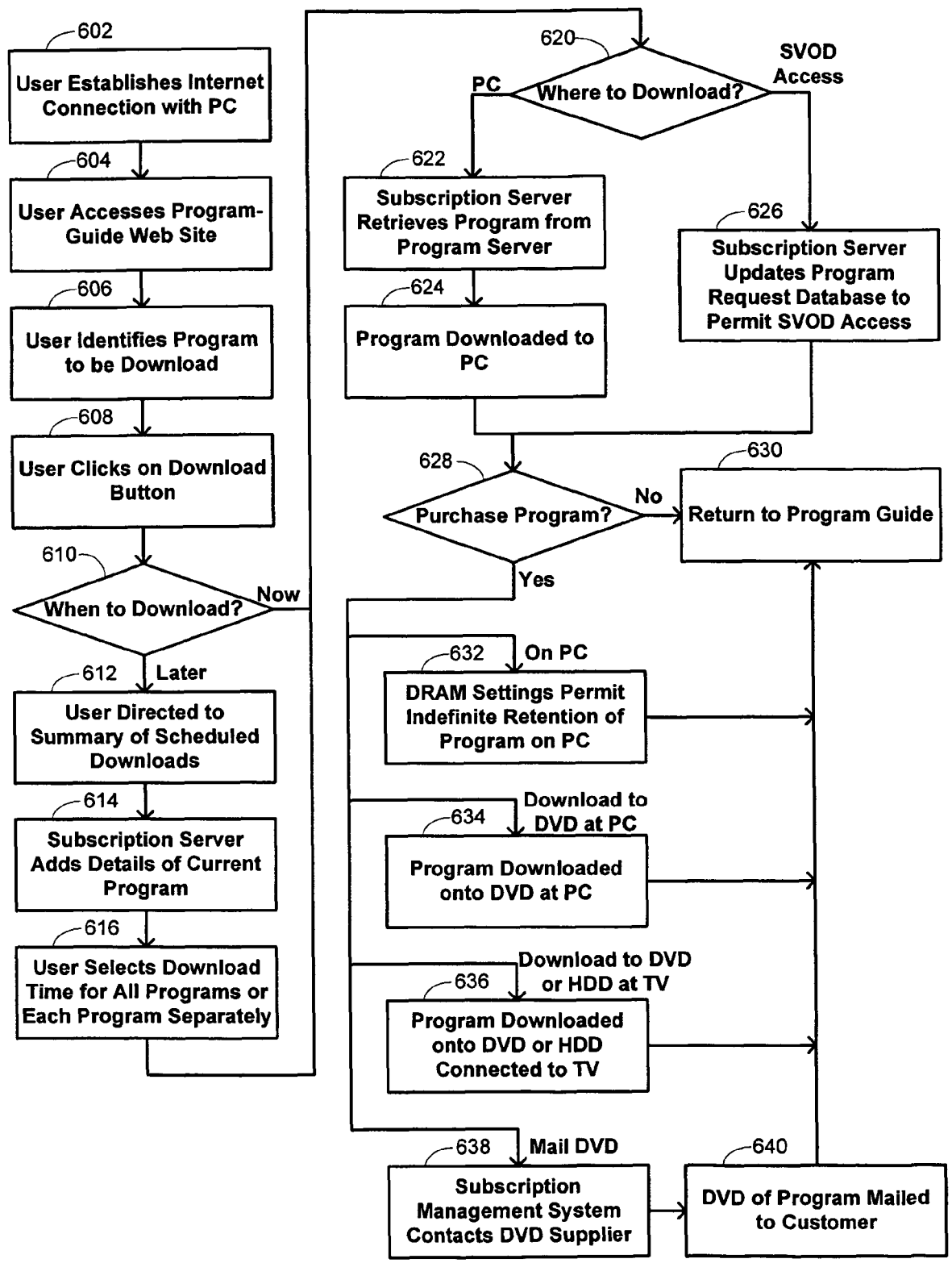
FIG. 6A is a flow diagram of a method for distributing entertainment programming according to another embodiment of the invention.
Figure 6B:
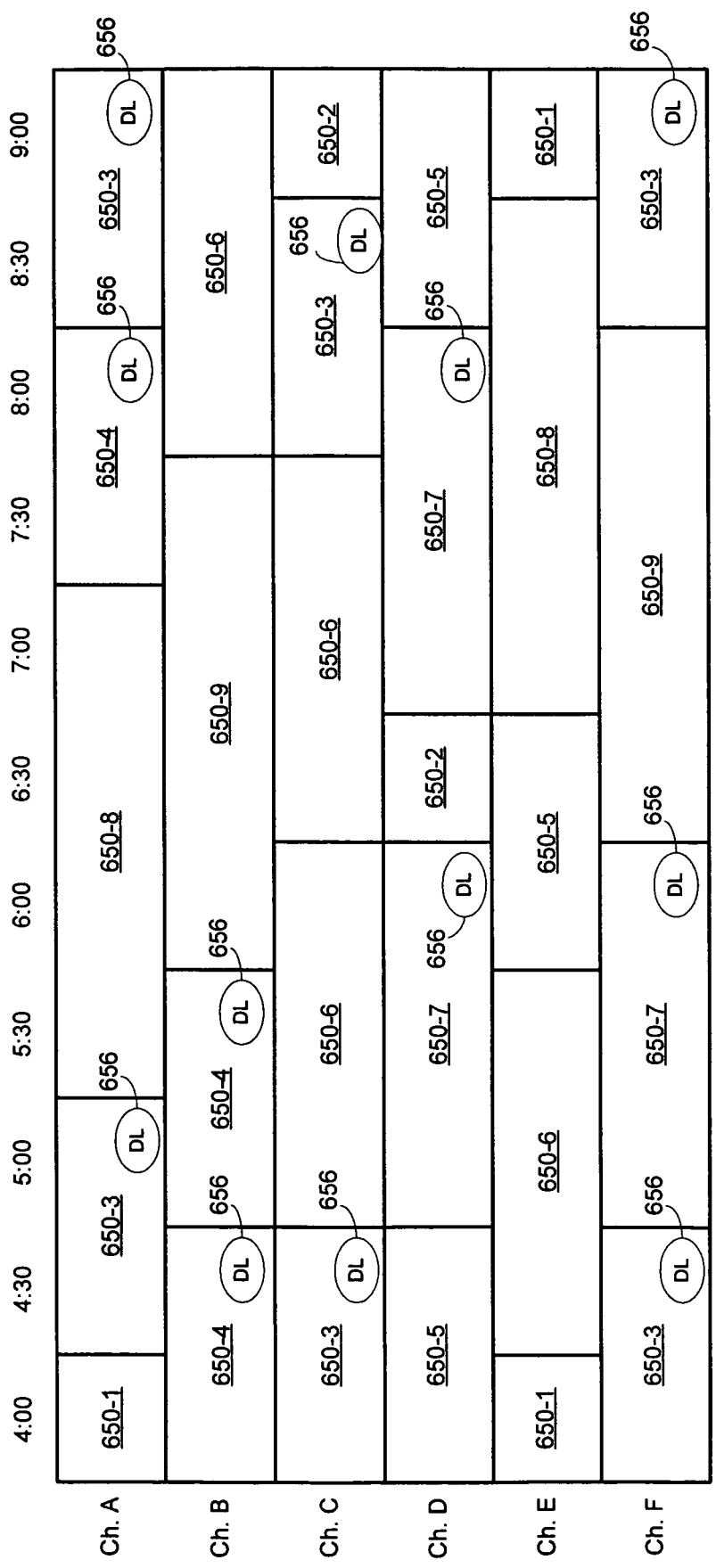
FIG. 6B is an example of a entertainment-program-guide display that may be used by a customer in receiving entertainment programming according to the method of FIG. 6A.
Figure 7:
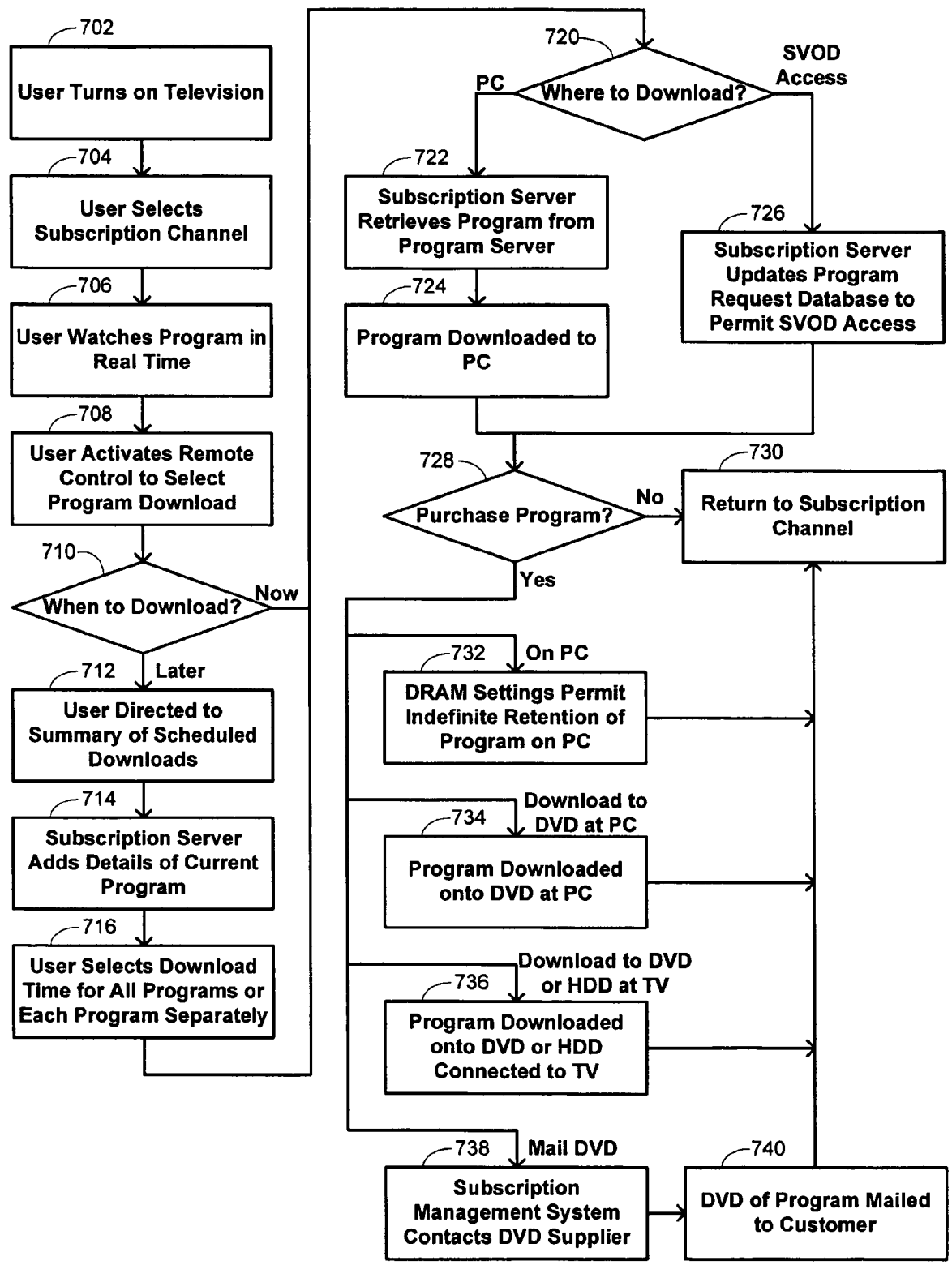
FIG. 7 is a flow diagram of a method for distributing entertainment programming according to a further embodiment of the invention.

The flow diagram of FIG. 6A also a method for distributing program that is initiated by a user customer on his computer 136. In this instance, after establishing a connection with a public network 120 at block 602, the user accesses a program guide on a site at block 604. The program guide generally provides a linear schedule of programming, in this instance of programming that is available as a simulcast transmission of programming that may also be provided to conventional content subscribers or to SVOD subscribers. An example of such a program guide is provided in FIG. 6B. This example shows a schedule of programs 650 of varying length on six distinct "channels," which may correspond to channels that define television access and/or may correspond to sites where the user may access the simulcast transmission of the programs 650 over the public network 120. The exemplary schedule includes nine distinct programs 650-1-650-9, repeated and staggered among various of the channels at times ranging from 4:00 to 9:00. The repetition and staggering accommodates different subscriber viewing habits within a fixed schedule. Of the nine distinct programs, three (650-3, 650-4, and 650-7) are available for download, as indicated with the icons 656 in the guide.

In some embodiments, navigating and searching the programming guide may be performed by downloading a scripting-language content array from the subscriber server 116 to the computer 136, permitting the content array to be accessed in performing such navigation functions. A further description of such capability is provided in concurrently filed U.S. Prov. Pat. Appl. No. 60/678,313, entitled "LOCAL CONTEXT NAVIGATION SYSTEM," by Bob Green et al., the entire disclosure of which has been incorporated herein by reference.

A user browsing the guide who identifies a program that he wishes to download at block 606 may click on the download button and thereby be presented with a number of options for the download and/or purchase of the program. Such options are similar to those described in connection with FIG. 5A, and are therefore discussed only briefly. First, the user may be given an option at block 610 to download the program immediately or to have the download occur later by directing the user at block 612 to a summary of scheduled downloads where the user may select program download times at block 616 after the subscription server adds details of the selected program at block 614. In addition, the user may be given an option at block 620 to download a program directly to her computer, in which case the subscription server 116 retrieves the program at block 622 and downloads it at block 624, or to be given access to the program as part of an SVOD service at block 626. The user may also be given the option to purchase the program at block 628 according to a number of different mechanisms, including having DRAM settings adjusted at block 632, downloading the program onto a DVD at the user's computer at block 634, downloading the program onto a DVD or HDD at a consumer device connected to a television at block 638, or having the subscription server contact a DVD supplier at block 638 to arrange for mailing of the program on a DVD at block 640. After making the various selections as they may be provided in different embodiments, the user is returned to the program guide at block 630.

In embodiments of the invention where the downloading system is interfaced with user set-top boxes, similar functionality as described in connection with FIGS. 5A and 6A may be provided at the user's television 140. One such set of embodiments is illustrated with the flow diagram of FIG. 7, in which the downloading is initiated by the user turning on her television an block 702 and selecting a subscription channel at block 704. This subscription channel may show a program that is simulcast with the programs that may alternatively be viewed from a computer 136 connected with the public network 120. Similar to the method described in connection with FIG. 5A, the user watches the program in real time at block 706, but on his television. The particular program being shown may not be included in the current SVOD offerings, but might be available to the user because of his participation in the downloading service, either as an addition to the SVOD offerings or as a download to his computer 136 to permit greater portability of the program. The availability of the program for download may be indicated by an icon superimposed over the program.

The user accordingly uses her remote control to select the program for download at block 708 and may be presented with a number of options similar to those already described in connection with FIGS. 5A and 6A. Effectively, the integration of the download system with the SVOD system permits the user to have the same functionality options when initiating a download from his television 140 as is provided when the download is initiated from his computer 136. Thus, at block 710, the user may be given the option to download the program immediately or later. If selecting the option to download later, the user may be directed at block 712 to a summary of scheduled downloads to which the current program has been added at block 714 so that the user may select the download times for the programs at block 716. At block 720, the user may be given the option to download the program to his computer 136 or to modify the SVOD offerings. The program is downloaded to the user's computer 136 at block 724 after the subscription server 116 retrieves the program from the program server 108. Alternatively, the SVOD offerings are updated at block 726 by having the subscription server 116 update the program-request database 132 to reflect the availability of the program to the user's set-top box 152 as part of the SVOD capability. At block 728, the user may be given an option to purchase the program according to one of several mechanisms. If the option is accepted, the user may select to have DRAM settings adjusted on his computer 136 at block 734 to permit indefinite retention of the program, may select to have the program downloaded onto a DVD at his computer 136 at block 734, may select to have the program downloaded onto a DVD or HDD at a device coupled with his television 140 at block 736, or may choose to have the subscription server 116 contact a DVD supplier at block 738 to initiate mailing of a DVD with the program at block 740. After considering and making selections for the various options, the user is returned to the subscription channel at block 730 to continue watching the program.

Figure 8A:
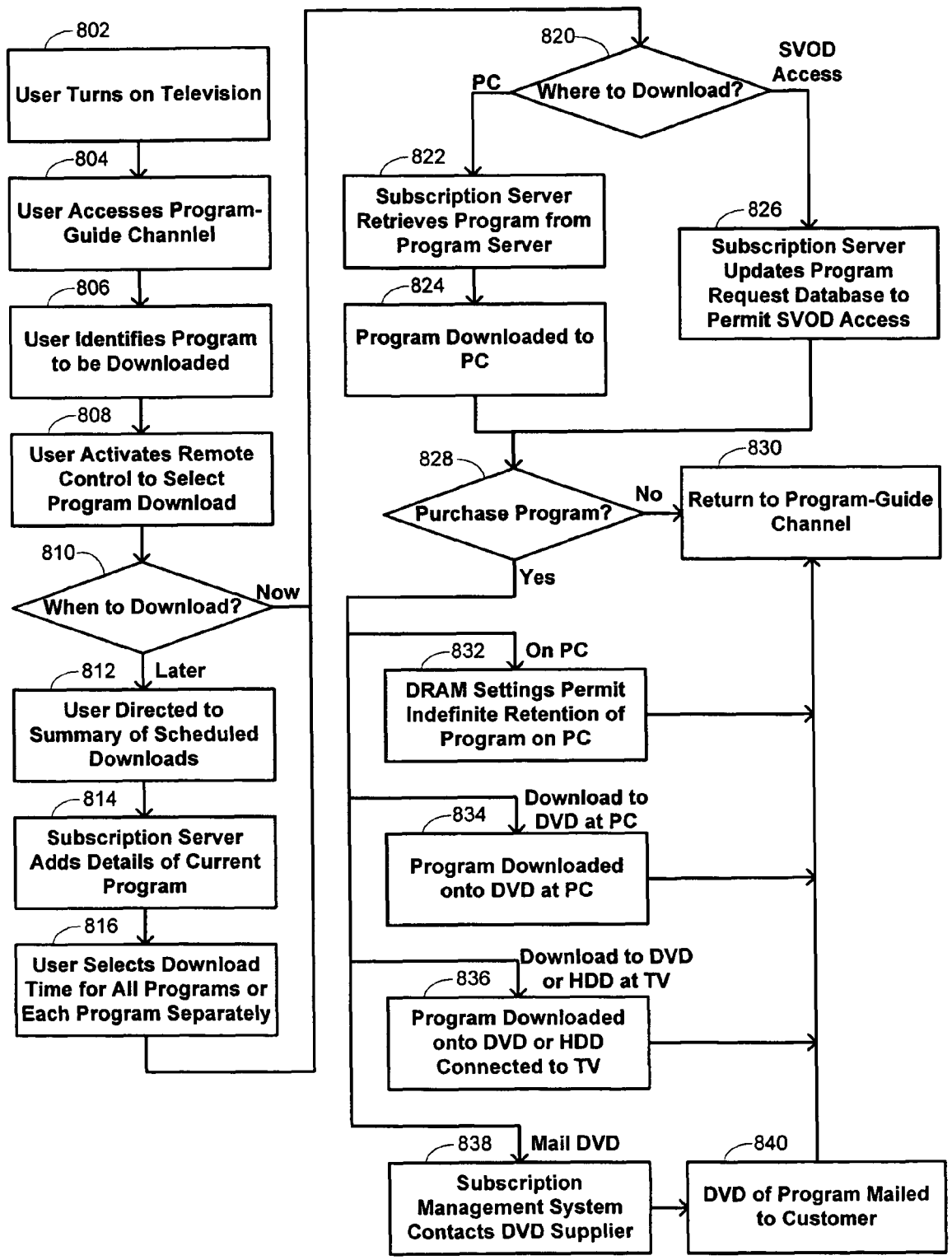
FIG. 8A is a flow diagram of a method for distributing entertainment programming according to still another embodiment of the invention.
Figure 8B:
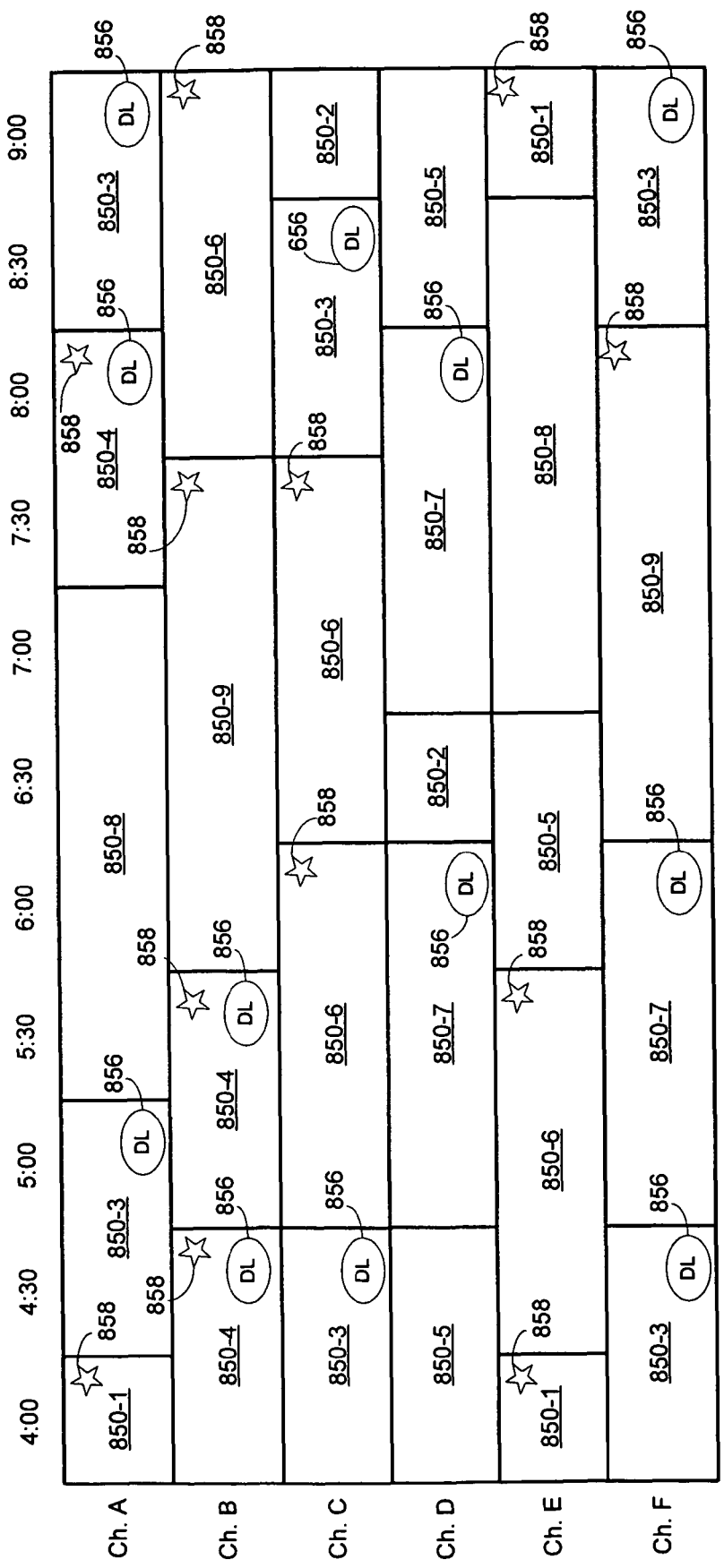
FIG. 8B is an example of an entertainment-program-guide display that may be used by a customer in receiving entertainment programming according to the method of FIG. 8A.

The method of distributing programming illustrated with the flow diagram in FIG. 8A is similar to the method described in connection with FIG. 6A in that the user makes a selection from a program guide, but in this instance the program guide is accessed from a user's television 140 rather than from her computer 136. After the user turns on the television at block 802, she accesses a program-guide channel at block 804. To illustrate the integration of the downloading system and the SVOD system, an exemplary program guide is shown in FIG. 8B that includes icons that denote programs that may be accessed as part of the SVOD service and programs that may be downloaded as part of the downloading service. In this example, the schedule of programs 850 is again shown on six distinct channel and includes nine distinct programs 850-1-850-9 that are repeated and staggered among various of the channels at times ranging from 4:00 to 9:00. Of the nine distinct programs, three are identified as available for download: 850-3, 850-4, and 850-7 by a download icon 856, and four are identified as available with program control as part of the SVOD service: 805-1, 850-4, 850-6, and 850-9.

It is thus apparent that the programs may be divided into four classes: those that are available both for download and as part of the SVOD service, those that are available only for download, those that are available only as part of the SVOD service, and those that are not available either for download or as part of the SVOD service. These different categories of programs may be valued different by different types of users. For example, a user who is a subscriber to both the SVOD and download programs will be interested primarily in those programs that are available for download but are not available as part of the SVOD service since this provides a mechanism for enhancing the SVOD offerings. Even with such different perspectives, all users may potentially be interested in the downloading features and in the ability to purchase a copy of the program.

To take advantage of such capabilities, the user identifies at block 806 of FIG. 8A which program he wishes to download and activates his remote control to select the program-download option at block 808. Having made such a selection, the user may be presented with the same options that are available in other embodiments, namely to choose an immediate or later download at block 810, an option to determine whether to download the program to his computer 136 or to add it as part of the SVOD offering at block 820, and the option to purchase the program at block 828. If the user chooses to download the program later, he may be directed at block 812 to a summary of scheduled downloads to which the selected program has been added at block 814 and provided with the ability to specify download times individually or collectively at block 816. If the user chooses to download the program to his computer 136, the subscription server 116 will retrieve the program from the program server at block 108 and initiate the download at block 824. If the user instead chooses to add the program to the SVOD offerings, the subscription server 116 will update the program-request database 132 at block 826 to permit such access. The various purchase options may be implemented by setting DRAM settings at block 832, downloading the program onto a DVD at the computer at block 834, downloading the program onto a DVD or HDD on a device 174 coupled with the user's television 140 at block 836, or having the subscription server 116 contact a DVD supplier at block 836 to arrange for mailing of a DVD with the program to the customer at block 840. After the user has made the various selections, he is returned to the program-guide channel at block 830.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for distributing programming, the method comprising:

transmitting a menu of entertainment programs over a public network for display on user computers in communication with the public network;

determining which of the entertainment programs in the menu is identified as available for download to user computers in accordance with a subscription agreement;

superimposing a notification symbol associated with each of the entertainment programs identified as available for download on the menu;

receiving a request from one of the user computers over the public network to download a specified one of the entertainment programs identified as available for download, wherein the request specifies that the specified one of the entertainment programs is to be transmitted over a television-programming distribution system; and transmitting the specified one of the entertainment programs to a subscriber set-top box via the television-programming distribution system for downloading onto a storage medium in communication with the subscriber set-top box, wherein the public network and the television-programming distribution-system are different networks, wherein a user is permitted to rewind, fast-forward or pause playback of the transmitted specified one of the entertainment programs;

transmitting a second notification signal with at least another of the entertainment programs to identify the at least another of the entertainment programs as part of an SVOD service; and receiving a request from a third of the user computers, over the public network to be given access to the specified one of the entertainment programs identified as available for download; wherein tile request specifies that the specified one of the entertainment programs is to be transmitted over the public network.

2. The method recited in claim 1 wherein the specified one of the entertainment programs transmitted to the subscriber set-top box includes restrictions preventing playback after a defined time.

3. The method recited in claim 1 further comprising receiving a request from the one of the user computers over the public network to purchase a copy of the specified one of the entertainment programs, wherein the specified one of the entertainment programs transmitted to the subscriber set-top box has no temporal playback restrictions.

4. The method recited in claim 1 further comprising:
receiving a request from the one of the user computers over the public network to purchase a copy of the specified one of the entertainment programs; and
downloading the specified one of the entertainment programs onto a portable storage medium through the public network and the one of the user computers.

5. The method recited in claim 1 further comprising:
receiving a request from the one of the user computers over the public network to purchase a copy of the specified one of the entertainment programs;
identifying a subscriber address associated with the one of the computers; and
transmitting a request to a seller of a portable storage medium having the specified one of the entertainment programs to send the portable storage medium having the specified one of the entertainment programs to the identified subscriber address.

6. The method recited in claim 1 wherein transmitting the specified one of the entertainment programs to the subscriber set-to box begins substantially immediately after receiving the request from the one of the user computers to download the specified one of the entertainment programs.

7. The method recited in claim 1 wherein transmitting the specified one of the entertainment programs to the subscriber set-top bOx begins after receiving the request from the one of the user computers to download the specified one of the entertainment programs at a time specified by a user.

8. The method recited in claim 1 further comprising generating a user interface for managing downloads of entertainment programs for display to a user after receiving the request from the one of the user computers oyer the public network to download the selected one of the entertainment programs.

9. The method recited in claim 1 wherein the public network is the Internet.

10. The method of claim 1 wherein selection of the symbol by the user computer initiates a formation of the request to download the specified, one of the entertainment programs identified as available for download.

11. The method of claim 1 wherein download options are presented to the user computer upon activation of the symbol.

12. A method for distributing programming, the method comprising:
transmitting a set of entertainment programs in real time over a television-programming distribution system to set-top boxes connected with the television-programming distribution system for display on televisions connected with the set-top boxes, wherein a user may pause, rewind or fast-forward at least one of the transmitted set of entertainment programs using one of the set-top boxes;
transmitting a notification signal with at least one of the entertainment programs to identify the at least one of the entertainment programs as available for download;
receiving a request initiated by the user from the one of the set-top boxes over the television-programming distribution system to download the at least one of the entertainment programs, wherein the request specifies that the specified one of the entertainment programs is to be transmitted over a public network to a user computer associated with the one of the set-top boxes;
identifying the user computer authorized to receive downloaded entertainment programs and associated with the one of the set-top boxes, the user computer in communication with the public network; and
downloading the at least one of the entertainment programs over the public network to the user computer, wherein the public network and the television-programming distribution system are different networks;
transmitting a second notification signal with at least another of the entertainment programs to identify the at least another of the entertainment programs as part of an SVOD service;
receiving a request initiated by a second user from another of the set-top boxes over the television programming distribution, system to access the at least another of the entertainment programs, wherein the request specifies that the specified one of the entertainment programs is to be transmitted over the television programming distribution system to the another of the set-top boxes; and
modifying SVOD offerings available to the second user through the another of the set-top boxes, such that the modified offerings include the at least another of the entertainment programs.

13. The method recited in claim 12 wherein the at least one of the entertainment programs downloaded to the user computer includes restrictions preventing playback after a defined time.

14. The method recited in claim 12 further comprising receiving a request to purchase a copy of the at least one of the entertainment programs, wherein the at least one of the entertainment programs downloaded to the user computer has no temporal playback restrictions.

15. The method recited in claim 12 further comprising:
receiving a request to purchase a copy of the at least one of the entertainment programs; and
downloading the at least one of the entertainment programs onto a portable storage medium through the public network and the user computer.

16. The method recited in claim 12 further comprising:
receiving a request to purchase a copy of the at least one of the entertainment programs; and
downloading the at least one of the entertainment programs onto a portable media player through the public network and the user computer.

17. The method recited in claim 12 further comprising:
receiving a request to purchase a copy of the at least one of the entertainment programs;
identifying a subscriber address associated with the one of the set-top boxes or with the user computer; and
transmitting a request to a seller of a portable storage medium having the at least one of the entertainment programs to send the portable storage medium having the at least one of the entertainment programs to the identified subscriber address.

18. The method recited in claim 12 further comprising:
receiving a request to purchase a copy of the at least one of the entertainment programs; and transmitting the at least one of the entertainment programs to the one of the set-top boxes for downloading onto a storage medium in communication with the one of the set-top boxes.

19. The method recited in claim 12 wherein downloading the at least one of the entertainment programs to the user computer begins substantially immediately after receiving the request from the one of the set-top boxes to download the at least one of the entertainment programs.

20. The method recited in claim 12 wherein downloading the at least one of the entertainment programs to the user computer begins after receiving the request from the one of the set-top boxes to download the at least one of the entertainment programs at a time specified by the user.

21. A method for distributing programming, the method comprising:
- transmitting a menu of entertainment programs over a television-programming distribution system to set-top boxes connected with the television-programming distribution system for display on televisions connected with the set-top boxes;
- determining which of the entertainment programs in the menu is identified as available for download to user computers in accordance with a subscription agreement;
- superimposing a notification symbol associated with each of the entertainment programs identified as available for download on the menu;
- receiving a request initiated by a user from one of the set-top boxes over the television-programming distribution system to download a specified one of the entertainment programs identified as available for download, wherein the request specifies that the specified one of the entertainment programs is to be transmitted over a public network to a user computer associated with the one of the set-top boxes;
- identifying the user computer authorized to receive downloaded entertainment programs and associated with the one of the set-top boxes, the user computer in communication with the public network; and
- downloading the specified one of the entertainment programs over the public network to the user computer, wherein the public network and the television-programming distribution system are different networks;
- transmitting a second notification signal with at least another of the entertainment programs to identify the at least another of the entertainment programs as part of an SVOD service;
- receiving a request initiated by a second user from another of the set-top boxes over the television programming distribution, system to access the at least another of the entertainment programs, wherein the request specifies that the specified one of the entertainment programs is to be transmitted over the television programming distribution system to the another of the set-top boxes; and
- modifying SVOD offerings available to the second user through the another of the set-top boxes, such that the modified offerings include the at least another of the entertainment programs.

22. The method recited in claim 21 wherein the specified, one of the entertainment programs downloaded to the user computer includes restrictions preventing playback after a defined time.

23. The method recited in claim 21 further comprising receiving a request to purchase a copy of the specified one of the entertainment programs, wherein the specified one of the entertainment programs downloaded to the user computer has no temporal playback restrictions.

24. The method recited in claim 21 further comprising:
- receiving a request to purchase a copy of the specified one of the entertainment programs; and
- downloading the specified one of the entertainment programs onto a portable storage medium through the public network and the user computer.

25. The method recited in claim 21 further comprising:
- receiving a request to purchase a copy of the specified one of the entertainment programs;
- identifying a subscriber address associated with the one of the set-top boxes or with the user computer; and
- transmitting a request to a seller of a portable storage medium having the at least one of the entertainment programs to send the portable storage medium having the at least one of the entertainment programs to, the identified subscriber address.

26. The method recited in claim 21 further comprising:
- receiving a request to purchase a copy of the specified one of the entertainment programs; and
- transmitting the specified one of the entertainment programs to the one of the set-top boxes for downloading onto a storage medium in communication with the one of the set-top boxes.

27. The method recited in claim 21 wherein downloading the specified one of the entertainment programs to the user computer begins substantially immediately after receiving the request from one of the set-top boxes to download the specified one of the entertainment programs.

28. The method recited in claim 21 wherein downloading the specified one of the entertainment programs to the user computer begins after receiving the request from the one of the set-top boxes to download the at least one of the entertainment programs at a time specified by the user.

* * * * *